United States Patent [19]

Bonner

[11] 4,079,114

[45] Mar. 14, 1978

[54] METHOD AND APPARATUS FOR EMBOSSING SHEETS

[75] Inventor: William James Bonner, Ashawa, R.I.

[73] Assignee: Leesona Corporation, Warwick, R.I.

[21] Appl. No.: 689,672

[22] Filed: May 24, 1976

Related U.S. Application Data

[63] Continuation-in-part of Ser. No. 519,783, Oct. 31, 1974, abandoned.

[51] Int. Cl.$^2$ .............................................. B29D 7/14
[52] U.S. Cl. ................................ 264/210 R; 264/284; 264/DIG. 47; 425/224; 425/324.1; 425/363
[58] Field of Search ............... 425/324, 363, 224, 385, 425/DIG. 200, DIG. 201, 149, 324.1, 249; 83/155, 156; 264/210 F, 210 R, DIG. 47, 293, 175, 284, 147, 294, 296

[56] References Cited

U.S. PATENT DOCUMENTS

| | | | |
|---|---|---|---|
| 2,296,372 | 9/1942 | Smith et al. | 425/449 |
| 2,526,318 | 10/1950 | Battin | 425/335 |
| 2,598,866 | 6/1952 | Warp | 425/224 |
| 2,614,288 | 10/1952 | Chavannes | 264/147 |
| 2,728,950 | 1/1956 | Annesser | 264/284 |
| 3,066,366 | 12/1962 | Wychoff et al. | 24/16 |
| 3,074,114 | 1/1963 | Petry | 264/284 |
| 3,320,225 | 5/1967 | Bradbury | 264/284 |
| 3,566,638 | 3/1971 | Herbst | 72/8 |
| 3,709,647 | 1/1973 | Barnhart | 425/363 |
| 3,718,059 | 2/1973 | Clayton | 264/154 |
| 3,761,552 | 9/1973 | Chill et al. | 264/147 |
| 3,810,729 | 5/1974 | Patchell | 264/284 |
| 3,859,027 | 1/1975 | Messner | 425/363 |
| 3,869,831 | 3/1975 | Gibb | 264/147 |

*Primary Examiner*—Jeffery R. Thurlow

*Attorney, Agent, or Firm*—Burnett W. Norton

[57] ABSTRACT

Disclosed herein is a method and apparatus for forming a sheet of extruded deformable polymer with a plurality of longitudinally extending fracture lines along which splitting can occur to sub-divide the sheet into a plurality of filaments or tapes. The apparatus includes an elongated embossing roll having circumferential ridges formed on the periphery thereof with a cooperable backing roll positioned to press the sheet into engagement with the embossing roll so that the ridges and intervening grooves of the embossing roll are formed in the hot plastic sheet. The zone between the backing roll and embossing roll constitutes a first nip zone. A pressure roll is disposed adjacent to the embossing roll with a second nip zone being defined between these two rolls. The pressure roll is spaced downstream from the backing roll, having reference to the direction of movement of the sheet, a distance sufficient to permit the outer surfaces of the hot sheet to cool and set but to permit the center region between the surfaces to remain plastic. Thus, the hot sheet which has been embossed at the first nip zone is reformed at the second nip zone with the embossments from the embossing roll thereby correcting for any distortion in the original embossments which occur as the sheet begins to cool. Consequently, the final product is a sheet having highly accurate embossments therein. The cooperative effect of the first and second nip zones also acts to retain the sheet against the embossing roll as the sheet moves from the first nip zone to the second nip zone. Means are provided for adjusting the pressure which the pressure roll exerts to force the sheet into engagement with the embossing roll.

11 Claims, 9 Drawing Figures

METHOD AND APPARATUS FOR EMBOSSING SHEETS

CROSS-REFERENCE TO RELATED APPLICATIONS

This application is a continuation-in-part of copending U.S. application Ser. No. 519,783 filed Oct. 31, 1974 now abandoned.

BACKGROUND OF THE INVENTION

The present invention relates to method and apparatus for forming a sheet of extruded deformable polymer, and relates, more particularly, to method and apparatus for so forming such a sheet with a plurality of longitudinally extending fracture lines along which the sheet may be split to thereby sub-divide the sheet into tapes, ribbons or filaments.

In commercial usage the term "sheet" is often employed to designate heavier gauge material, say 0.010 inches, and which may be provided in discrete lengths while the term "film" usually refers to lighter gauge materials of substantial length. Notwithstanding these distinctions which are found in commercial practice the term "sheet" as utilized herein is intended to mean both sheet and film material whatever the length and thickness thereof might be.

Synthetic textile strand material requires the production of high quantity, smooth, well-defined, fine denier filaments. The conventional way of insuring this is by extruding a group of monofilaments from a spinneret. This requires highly specialized and expensive equipment to get useful production of the fibers. A more recent approach has been to advance an extruded deformable polymer sheet from extrusion apparatus and as a continuous process emboss or profile the sheet in a predetermined pattern such that controlled splitting into smooth, uniform multi-filamentary yarn is achieved. A typical apparatus for achieving this result employs a positively driven roll embossed with a plurality of ridges and grooves extending at spaced apart intervals around the periphery of the roller. A backing roll cooperates with the embossing roll to form a pinch line or nip through which the extruded sheet is advanced so that the polymer sheet has the configuration of the embossing roll formed therein. After embossing the sheet is continuously advanced to further processing steps where it is fibrillated or split by suitable mechanical means along the embossed fracture lines to firstly provide a series of tapes with the tapes thereafter being further split to provide monofilaments which lend themselves to further processing into textile end products.

While the embossing technique as just related functions admirably to provide high speed production of monofilaments, it has been found that, due to the inherent memory in the polymer sheet, after it is embossed the fracture lines in the sheet tend to lose some of their definition. That is to say, the ribs which are formed in the sheet thicken so that the desired denier as defined by the embossments on the embossing roll is altered and, further, the webs lightly joining the ribs together thicken as the polymer sheet attempts to return to its original character. These conditions, of course, is undesirable in that the monofilamentary material ultimately produced by the embossing process is of somewhat unpredictable denier and, additionally, fracturing of the sheet into its constituent tapes and monofilaments is made more difficult by virtue of the alteration of the fracture lines.

SUMMARY OF THE INVENTION

The present invention admirably overcomes the aforementioned deficiencies of the known embossing apparatuses by incorporating mechanism operable to increase the residence time of the sheet in engagement with the embossing roll such that the sheet is not separated from engagement with the embossing roll until the ribs and grooves which have been embossed into the sheet are cooled sufficiently to set and, thus, preclude the partial recovery which, as aforesaid, has been experienced in operation of the prior art apparatuses. In practice with the present invention an elongated embossing roll is provided having a plurality of ridges and grooves formed around the periphery thereof. Desirably the embossing roll is positively cooled. A backing roll is situated in engagement with the embossing roll with a first nip zone being provided between these two rolls. Sheet being extruded from an extrusion die is guided between the embossing roll and the backing roll to thus cause a plurality of ribs and grooves to be embossed into the sheet. Downstream of the point at which embossing of the sheet is accomplished there is provided pressure means in the form of one or a series of rolls or, in the alternative, a belt which is cooperatively mounted with the embossing roll to provide a second nip zone through which the embossed sheet is guided. It is important to note that the embossed sheet is thus held in intimate contact with the embossing roll with the respective grooves and ribs of the sheet maintaining the same relationship with the embossments on the embossing roll as the sheet passes from the first nip zone to the second nip zone. The zone intermediate the first and second nip zones constitutes a cooling zone through which the embossed sheet passes. In this cooling zone the embossed sheet is partially cooled so that a firm skin forms on both sides of the sheet, yet the center section of the sheet is not so cooled but, rather, is still in a plastic state so as to admit of some reshaping as the sheet passes through the further nip. Accordingly, after the sheet is initially embossed the inherent memory in the plastic sheet causes some deformation of the embossments in the sheet. The second nip zone acts to reform the sheet with the embossments from the embossing roll after the sheet has been partially cooled so that as the sheet emerges from the second nip zone it is set through its complete thickness so as to preclude substantial further distortion of the embossments in the sheet. The pressure means incorporates mechanism for adjusting the pressure by which the pressure means is biased toward the embossing roll. Consequently, new and improved apparatus for forming a sheet of extruded deformable polymer with a plurality of longitudinally extending fracture lines along which splitting can occur to sub-divide the sheet is provided hereby.

In keeping with the foregoing it is one object of the present invention to provide improved method and apparatus for forming a polymer sheet with a plurality of longitudinally extending fracture lines.

A further object of the present invention is to provide method and apparatus for forming a polymer sheet with a plurality of longitudinally extending fracture lines and positively controlling the engagement of the sheet with the embossing means for a predetermined interval.

Still a further object of the present invention is to provide method and apparatus for forming a polymer sheet with a plurality of longitudinally extending fracture lines by embossing said lines in the surface of the sheet and subsequently processing the sheet to maintain the embossed configuration and preclude substantial recovery of the sheet to its pre-embossed condition.

Another object of the present invention is to provide method and apparatus for embossing a heated polymer sheet with a plurality of longitudinally extending fracture lines at a first zone and thereafter passing the sheet through a second zone after a predetermined interval of time during which time the outside surfaces of the sheet have been cooled and solidified but the interior of the sheet is still plastic, to thereby reform the fracture lines in the sheet in said second zone.

These and other objects of the invention will in part be obvious and will in part appear hereinafter.

DESCRIPTION OF THE PREFERRED EMBODIMENT

Figure 1:
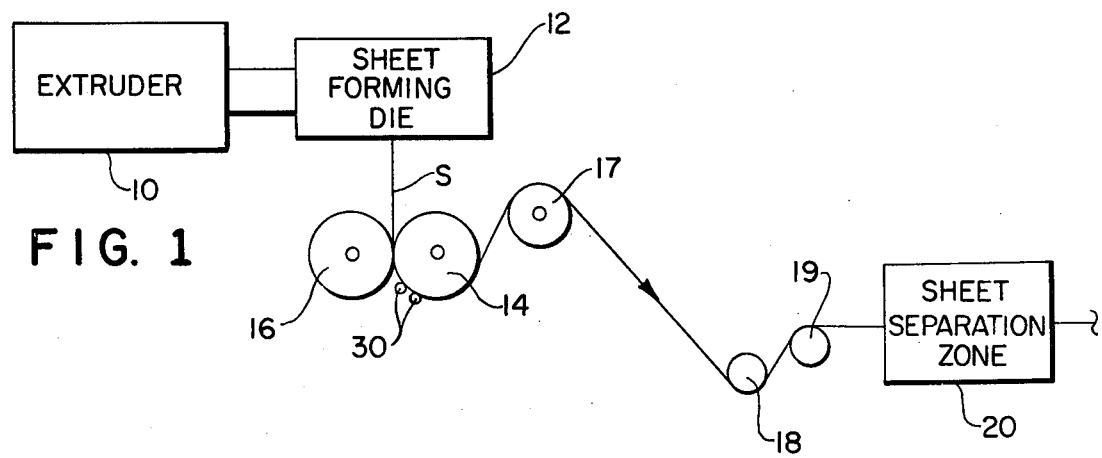
FIG. 1 is a diagrammatic representation of a conventional extrusion line incorporating the present invention.
Figure 8:
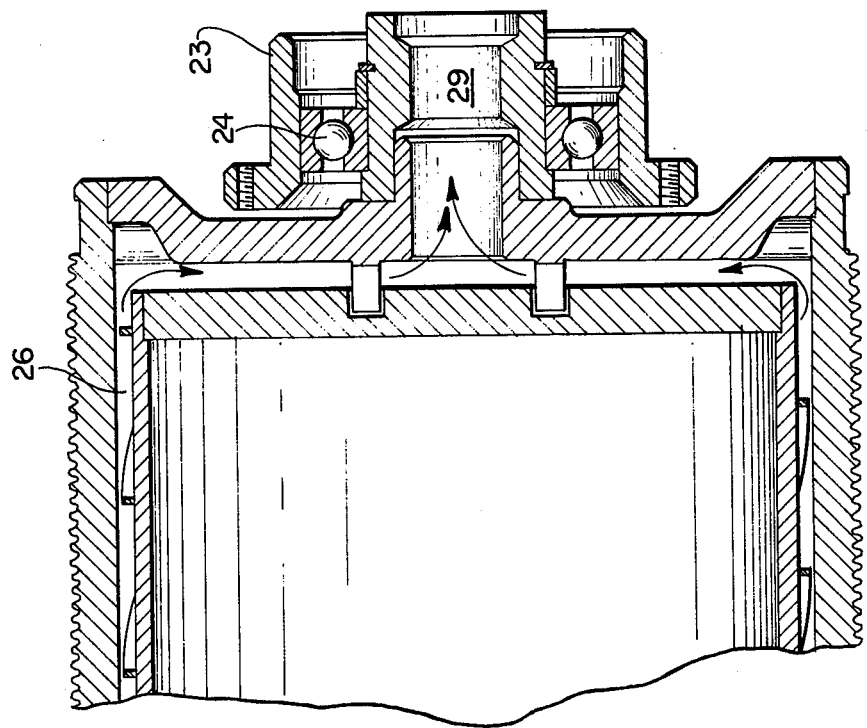
FIG. 8 is a cross-sectional view of the embossing roll of the present invention showing the details of the cooling means therefor.

Referring now to FIG. 1 of the drawing a typical plastic sheet processing line is depicted which includes a heated extruder 10 which receives polymer chips, granules or powder of thermoplastic materials, such as polypropelene, with the thermoplastic materials being heated in the extruder and extruded through a die 12 in the form of sheet S. Sheet S is delivered vertically downwardly into and through the nip of an embossing roll 14 and a backing roll 16 and is thereafter guided around an advancing roll 17 and over guide rolls 18 and 19 to be ultimately received at a station 20 where the sheet is separated into constituent tapes or filaments by such means as drawing, slitting, bi-axial stretching or a combination of the foregoing. One known process effects fracturing of the sheet into tapes at station 20, with the final dividing of the tapes into bundles of monofilaments being achieved during a subsequent twisting step. The continuous precedure described up to this point is well known in the art and, accordingly, the details of the several structures, their relative operating speeds, temperatures, tensions and the like need not be described more fully herein. It will be useful however, in providing a full and complete understanding of the present invention, to mention that embossing roll 14 and backing roll 16 are both constructed of steel or similar not-yielding materials. These rolls are carefully positioned so that as the sheet passes through the nip of these two rolls the sheet will be pressed against the embossing roll 14 by backing roll 16, essentially a line contact being formed between embossing roll 14 and backing roll 16. In practice, backing roll 16 is biased against embossing roll under about 100 pounds pressure per inch of width of sheet S. As a result, sheet S is impressed by the embossing roll 14 with the desired number of grooves without the ribs 21 of the embossing roll cutting through the sheet. The embossing roll may be provided, for example, with 60 to 75 ribs per inch and may be, say, 14 inches in diameter with a width of 36 inches. The embossing roll 14 is positively rotated to provide a throughput of sheet in the order of 20 to 100 feet per minute. A normal condition is that the plastic sheet S has a temperature of about 450° to 500° F upon its presentation to the nip between embossing roll 14 and backing roll 16. Thus, it is desirable to cool the sheet and this may be accomplished by maintaining the temperature of embossing roll in the order of 80° to 120° F by circulating cooled water through the shell-like interior of the embossing roll 14. To this end, and as best seen in FIG. 8, embossing roll 14 has central supporting shafts 22 and 23 supporting the embossing roll for rotation in respective bearings 24. Shafts 22 and 23 are made hollow and cold water from an appropriate source not shown is supplied through a channel 25 in the shaft 22. This cold water, being under pressure, flows through channel 25 and into a continuous helical passageway 26 formed between inner and outer walls 27 and 28 of the embossing roll 14. The water exits through outlet channel 29 formed in shaft 23. In a similar fashion and with a view to further cooling the sheet positively driven advancing roll 17 amy be similarly water cooled.

Figure 2:
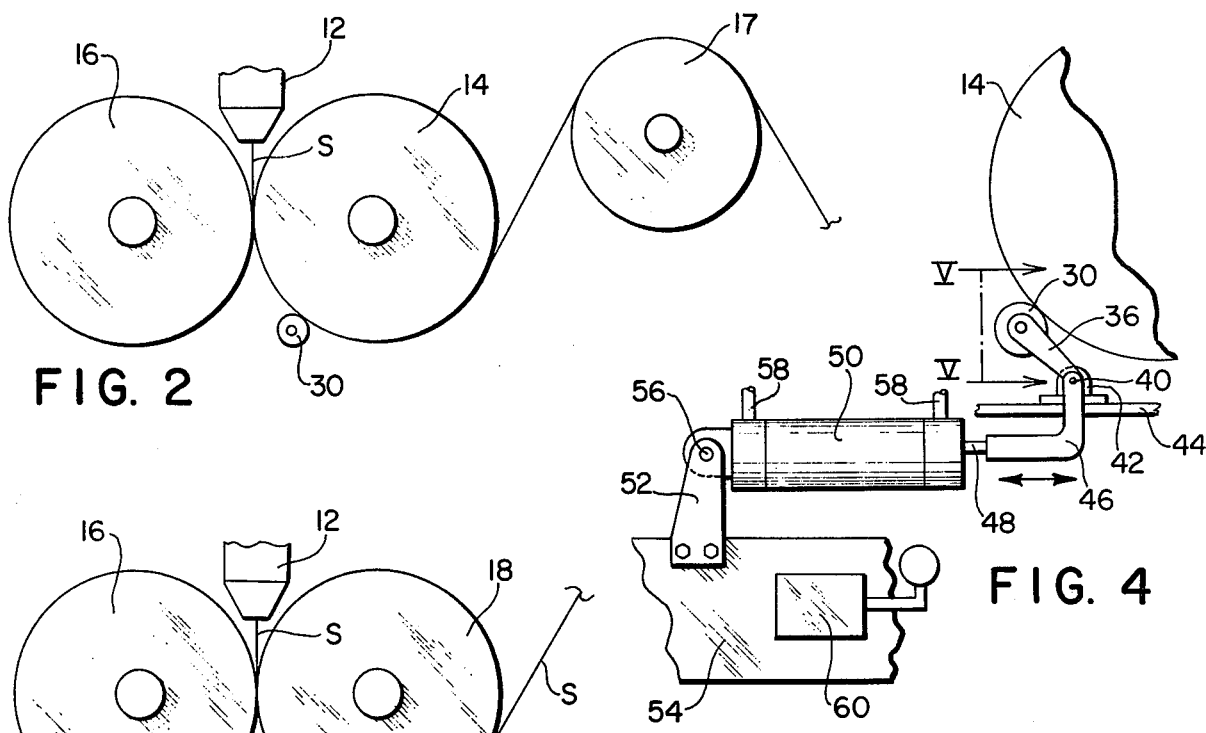
FIG. 2 is a fragmentary view of a portion of the apparatus of FIG. 1 on somewhat enlarged scale illustrating one form of the invention cooperatively arranged with the embossing roll.
Figure 4:
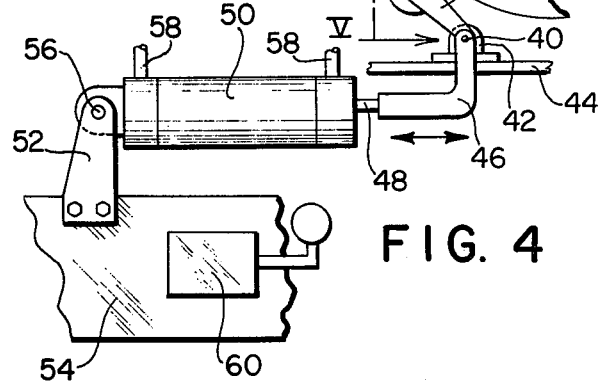
FIG. 4 is a detailed side elevational view of the mechanism for biasing the pressure means of the present invention toward the embossing roll.
Figure 5:
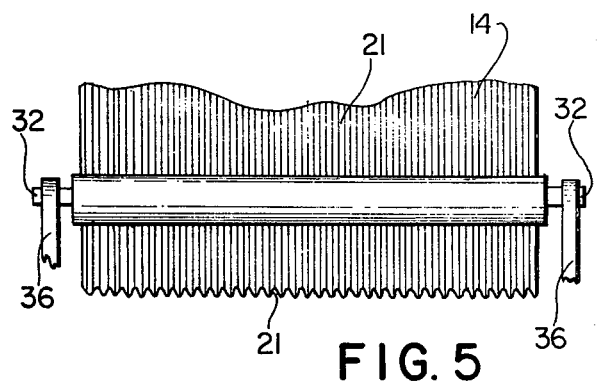
FIG. 5 is a view along lines V—V of FIG. 4.

Turning attention now to FIGS. 2, 4 and 5 it will be seen that a plain surface pressure roll 30 is positioned downstream of the nip point between embossing roll 14 and backing roll 16, having regard to the path of movement of sheet S. As seen in axial FIG. 5 pressure roll 30 is coextensive in length with the embossing roll 14. Pressure roll 30 is provided with oppositely extending bearing portions 32 which are received in bearing support members 36. In turn, each of the bearing support members 36 is rockably mounted on a shaft 40 which extends parallel with pressure roll 30, the shaft 40 being engaged at its opposite ends in respective opposite mounts 42, one adjacent each end of roll 14. A platform 44 serves as a floor for each of the mounts 42. Shaft 40 has affixed fast thereon at its opposite ends the bearing support members 36 and, further, has a pair of bell crank levers 46 fast thereon, one at each end of said shaft 40. Each of the bell crank levers 46 is connected with a respective air actuated piston rod 48 seated in a cylinder 50. As seen in FIG. 4 where one cylinder and piston for one bell crank lever is shown, the rear end of cylinder 50 is secured to a bracket 52 which is affixed to frame 54 which is rockably mounted on bracket 52 via a pivot pin 56. The opposite ends of air cylinder 50 are provided with the usual air lines 58 which feed compressed air on signal to the cylinder to actuate piston 48 in opposite directions. An adjustable air regulator 60 is secured on frame 54 and incorporates a manually operated four-way valve (not shown) for directing air to the desired end of air cylinder 50 to thereby shift piston 48 in the required direction. From FIG. 2 it will be seen that actuation of piston 48 in a rightward direction, i.e., in a direction to extend piston 48 out of cylinder 50 will swing pressure roll 30 in a counterclockwise direction and thus away from communication with embossing roll 14. In a similar fashion actuation of piston 48 to retract it into cylinder 50 will cause the pressure roll to swing into surface engagement with embossing roll 14 in the absence of a sheet. It will be evident that a nip is thus provided between embossing roll 14 and pressure roll 30 through which sheet S can pass and be pressed into engagement with the surface of embossing roll 14 under a preselected adjustable pressure determined by the air pressure passed into air cylinder 50 through regulator 60 and the appropriate power line 58. Desirably, pressure roll 30 is covered with a resilient material such as rubber to provide even distribution of the pressure from the roll uniformly across the width of embossing roller 14. It will be understood that each end of pressure roll 30 is controlled by the air cylinder arrangement just described.

Pressure roll 30 acts as a former for sheet S. That is to say, when properly placed in reference to the nip between embossing roll 14 and backing roll 16 it will insure that the sheet will ultimately be formed with the desired embossed pattern. As the sheet S is passed as a hot melt through the nip between embossing roll 14 and backing roll 16 the sheet is forced into the grooves between ribs 21, thus causing stresses in the sheet. Since the molecules of the plastic are forced into a random pattern during the initial embossing, the plastic memory, i.e., the tendancy of the sheet to return to its former shape, acts to cause some distortion in the embossments formed in the sheet by the embossing roll as soon as the sheet exits from the nip defined between embossing roll 14 and backing roll 16.

Figure 9:
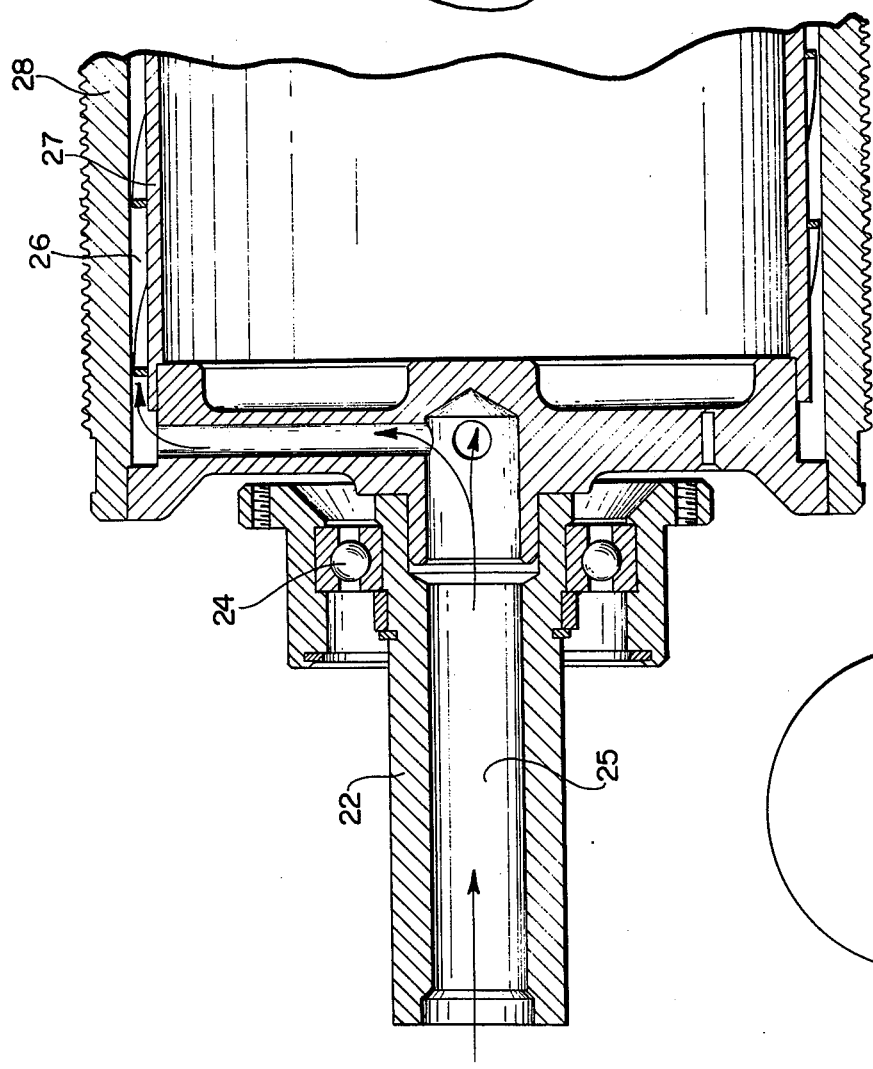
FIG. 9 is a detail view illustrating the engagement of the pressure roll with the embossing roll.
Figure 9:
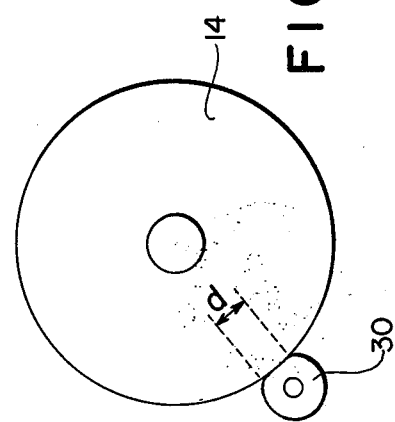

As the sheet moves away from the aforementioned nip the sheet begins to cool so that a hardened "skin" or layer is formed on the surfaces of the sheet. However, the interior of the sheet remains in a plastic state for a somewhat longer time than the surface of the sheet. Thus, as the sheet continues to cool and just prior to that time when the center of the sheet solidifies the sheet is once again forced against embossing roll 14 by pressure roll 30. Since the center of the sheet is still plastic a reforming of the sheet is achieved to redefine the formation of the embossments in the sheet in accordance with the shape of the ribs and grooves in the embossing roll 14. Desirably, pressure roll 30 is positioned to act on sheet S at the final instant that the sheet will admit of reforming, i.e., just prior to the time when the center of the plastic sheet solidifies from its plastic condition. Thus, when the sheet emerges from the nip between pressure roll 30 and embossing roll 14 it is cooled to an extent such that further deformation of the ribs and grooves therein is essentially precluded. It has been found to advantage to squeeze the pliable pressure roll 30 against embossing roll 14 under pressure so that pressure roll 30 engages chordally with the embossing roll 14 for a distance of about one-half inch as identified by the distance $d$ in FIG. 9 so that an area of contact is provided between pressure roll 30 and embossing roll 14. The distance $d$ is, of course, maintained between the pressure roll and embossing roll across the full axial dimension of the two rolls. In practice it has been found that successful embossing of sheet S is achieved in accordance with the present invention when polypropylene having a thickness of 0.005 inches as it emerges from die 12 is embossed by the cooperative action of embossing roll 14 and backing roll 16 with a web W of 0.0002 inches thickness and is subsequently forced against embossing roll by pressure roll 30 under 350 pounds pressure exerted on the opposite ends of the pressure roll by the respective pistons 48 to provide chordal contact of one-half inch between pressure roll 30 and embossing roll 14. In this instance the pressure roll has a hardness of 70 durometer.

The operation of the embodiment of the invention as more particularly disclosed in FIGS. 2, 4 annd 5 will be more or less evident from the foregoing description and the drawings. In summary, a plastic sheet, extruded from die 12, is directed vertically into the nip between embossing roll 14 and backing roll 16 where the sheet is embossed with the number of grooves and ridges existing in embossing roll 14 whereupon the sheet while still under tension is directed into the nip between pressure roll 30 and embossing roll 14. It is significant to note that the sheet does not leave engagement with embossing roll 14 between the time it is embossed with the ribs and grooves and the time the sheet passes in the nip formed between roll 30 and the embossing roll. Thus, the various ribs and grooves formed in the sheet maintain the same relationship with the specific ridges and grooves on the embossing roll from the time the sheet is embossed until the sheet leaves its engagement with the embossing roll. Pressure roll 30 is frictionally driven by contact with sheet S and serves to exert a predetermined pressure as determined by the air pressure biasing the roll 30 positively toward embossing roll 14 and into engagement with the sheet being embossed by the embossing roll.

Placement of pressure roll 30 circumferentially around embossing roll 14 from the nip wherein backing roll 16 engages the embossing roll is carefully selected so that the embossed sheet enters the nip zone between pressure roll 30 and embossing roll 14 after the sheet has been partially cooled to an extent where the surfaces of the sheet have a skin or solidification but where the center or the sheet, viewed cross-sectionally, is still plastic. The pressure roll 30 is biased against embossing roll 14 under pressure to provide area contact between the two rolls. Thus, as the sheet S enters the nip between these two rolls it is reformed with the embossments on the embossing roll to correct for any distortions occurring as the embossed sheet initially undergoes distortion in the zone between backing roll 16 and pressure roll 30. As sheet S emerges from the nip between embossing roll 14 and pressure roll 30 it is cooled throughout it thickness to a degree to substantially preclude further distorting of the embossments in the sheet.

In the description so far a single pressure roll 30 has been described as being arranged operatively with embossing roll 14 to provide a nip through which an advancing sheet of plastic S advances. It is within the scope of this invention to employ a plurality of such rolls and, accordingly, in FIG. 1 there is illustrated two such rolls arrannged at spaced apart locations around embossing roll 14, each being mounted as described hereinbefore and each being provided with biasing means such as the air piston and cylinder arrangement hereinbefore set forth to provide the desired chordal contact distance $d$ between the pressure rolls and embossing roll as described previously herein.

Figure 3:
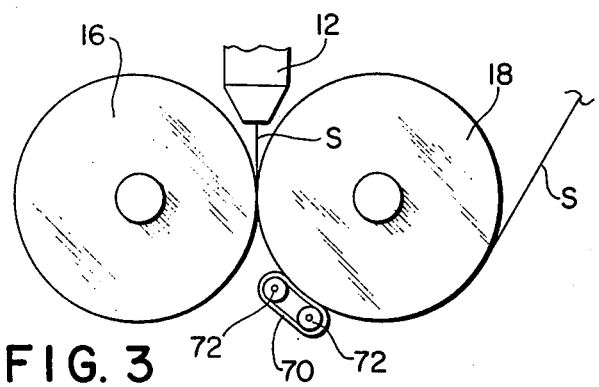
FIG. 3 is a view similar to FIG. 2 incorporating yet another modification of the invention.

In FIG. 3 a modification of the invention is illustrated wherein an endless apron or belt 70 is engaged about a pair of elongated shafts 72 with the belt and shafts extending across the full width of embossing roll 14. The shafts 72 are so arranged that belt 70 extends along a portion of the periphery of embossing roller 18 in surface contact therewith. Thus, a nip area is provided between embossing roll 18 and belt 70 through which sheet S is directed after being extruded from die 12 and embossed with the plurality of ribs and grooves at the nip between backing roll 16 and embossing roll 18. Belt 70 is driven frictionally in response to advance of sheet 18 and shafts 72 are mounted on support members such as those illustrated at 36 in FIG. 4 and biasing means in the form of cylinder 50 and piston 48 are provided to urge belt 70 toward embossing roll 18 under an adjustable predetermined force in the same manner as described in connection with pressure roller 30.

Figure 6:
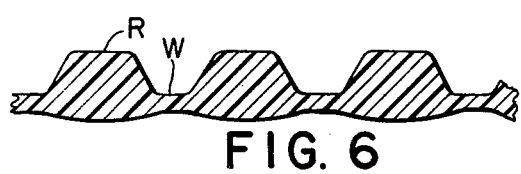
FIG. 6 is a cross sectional view of a section of embossed sheet made without the utilization of the present invention.
Figure 7:
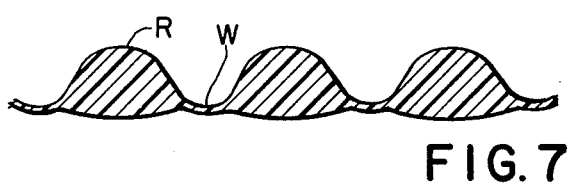
FIG. 7 is a view similar to FIG. 6 but demonstrating the shape of the surface of the embossed sheet in accordance with the present invention.

In FIGS. 6 and 7 there is illustrated a section of a sheet of plastic which has been embossed so as to be provided with ribs R and grooves by an embossing roll such as the embossing roll 14 described herein. FIG. 6 is a representation of a sheet which has been so embossed but wherein pressure means in accordance with the present invention were omitted. Thus, the ribs R of the sheet show contraction as evidenced by the rather flat crowns on each of the ribs, and the web W at the root of each groove shows thickening, here again caused by the tendancy of the sheet to contract after embossing. This contraction is thought to be due in large measure to the plastic memory inherent in the sheet. In contrast with the representation of a section of a plastic sheet embossed in the same manner as that of FIG. 6 but with the employment of a pressure roll 30 as hereinbefore set forth, an embossed sheet is provided which has ribs R which correspond substantially to the grooves embossed in the embossing roll 14 and, further, that the web W connecting the adjacent ribs R is extremely thin consistent with the thickness of web existing at the time of embossing of the sheet. The conditions as represented in FIGS. 6 and 7 are those of a completely cooled sheet so that the configurations of the sheet as shown in these two figures represents a stable condition of the product.

Accordingly, it will be understood that the present invention admirably provides apparatus for forming a sheet of extruded deformable polymer with a plurality of longitudinally extending fracture lines along which splitting can occur to sub-divide the sheet and wherein the sheet, after being directed through a nip zone to effect embossing thereof so that the sheet is provided with a plurality of fracture lines, is subsequently directed through control mechanism which retains the sheet in engagement with the embossing means for a predetermined interval sufficient for the sheet to cool so that the plastic memory inherent in the formed sheet will not be permitted to cause significant recovery of the sheet to occur from the embossed condition.

Since certain changes may be made in the foregoing apparatus without departing from the scope of the invention herein involved, it is intended that all matter contained in the above description or provided in the accompanying drawing shall be interpreted as illustrative only and not in a limiting sense.

What is claimed is:

1. A continuous method of forming a sheet of extruded polymer embossed with a plurality of longitudinally extending fracture lines along which splitting can occur to sub-divide the sheet, which method comprises the steps of: extruding a sheet of fluid polymer onto a continuous surface advancing along an endless path, said surface being profiled to emboss said sheet with said fracture lines and maintained at a temperature below the extrusion temperature of said sheet, first pressing said sheet from its opposite side positively into engagement with said profiled surface at about its initial locus of contact with said continuous profiled surface; advancing the thus pressed sheet while remaining in contact with the continuous profiled surface through a cooling zone in which the sheet face opposite said profiled surface is exposed to the ambient atmosphere whereby a firm skin is formed on both sheet faces; and before the interior of said sheet has solidified, again positively pressing said sheet into engagement with said profiled surface to re-form the embossment therein, said second pressing step maintaining said engagement over a portion of said endless surface path that is substantially greater than line contact and until said sheet is substantially cooled throughout its thickness; and removing the embossed sheet continuously from said profiled surface after said second pressing step.

2. The method as set forth in claim 1 including the steps of controlling the pressure under which the sheet is embossed in said first and second zones.

3. The method as set forth in claim 1 wherein the pressure under which said sheet is embossed in said second zone is less than the pressure under which the sheet is embossed in said first zone.

4. The method as set forth in claim 1 including the step of delivering said sheet to a separation zone after passage thereof through said second zone to thereby sub-divide said sheet.

5. Apparatus for forming a sheet of extruded deformable polymer with a precisely defined pattern of ridges and grooves comprising a continuous embossing surface mounted for movement about an endless path and carrying thereon a negative pattern of ribs and grooves corresponding to said pattern, said surface being cooled to cool said sheet, means for extruding a sheet of fluid polymeric material onto said embossing surface; first pressure means disposed at a first point on said embossing surface path at which said sheet is in substantially fluid condition and operative to positively force said sheet against said embossing surface to impress the contiguous sheet surface with under said pattern; second pressure means disposed at a second point on said surface path spaced downstream from said first point, the path portion between said points constituting a cooling zone within which the sheet face opposite said surface is exposed to a cooling atmosphere to form a firm skin and having a length such that the interior of said sheet is in plastic condition at said second point, said second pressure means being operative to positively force said sheet again into engagement with said surface to re-impress said pattern into said sheet face, said second pressure means contacting a lengthwise portion of said sheet substantially exceeding line thickness; and means for withdrawing said sheet from said surface downstream of said second point.

6. Apparatus as set forth in claim 5 wherein said pattern includes plural ridges transversely of said endless path, and both said pressure means extend in confronting relationship with each of said ridges.

7. Apparatus as set forth in claim 5 wherein said second pressure means includes at least one roller having a resilient surface.

8. Apparatus as set forth in claim 5 wherein said second pressure means includes a belt member.

9. Apparatus as set forth in claim 7 including means for biasing said roller into engagement with said roller means under predetermined pressure.

10. Apparatus as set forth in claim 9 including means for adjusting said biasing means.

11. A continuous method of embossing a sheet of extruded polymeric material with a pattern of ridges and grooves of precisely defined configuration, which comprises the steps of: extruding said sheet in fluid condition on a continuous surface profiled with a negative pattern of said ridges and grooves in said configuration, said surface being movable through an endless path and being maintained at a temperature sufficient to cool said sheet; applying positive pressure against said sheet at a point on said path where the sheet is in contact with said surface and is substantially entirely fluid to force the contiguous sheet face into engagement with said profiled pattern to impress said face with said pattern; removing said pressure and advancing said sheet with its contiguous face remaining in contact with said surface while its opposite face is exposed to a cooling atmosphere a sufficient distance to form a firm skin on said opposite face; while the interior of the sheet is still plastic, again applying positive pressure to said sheet over a lengthwise segment of said path that substantially exceeds line thickness to force the contiguous direct face again into engagement with said profile pattern to re-impress said pattern into said face; and continuously removing the thus-embossed sheet from said surface.

* * * * *